July 14, 1964

M. CLAR 3,140,788

SELF-LOADING VEHICLE

Filed March 14, 1961

INVENTOR.
MILTON CLAR
BY *Shapiro and Shapiro*
ATTORNEYS

July 14, 1964

M. CLAR 3,140,788

SELF-LOADING VEHICLE

Filed March 14, 1961

INVENTOR.
MILTON CLAR
BY
*Shapiro and Shapiro*
ATTORNEYS

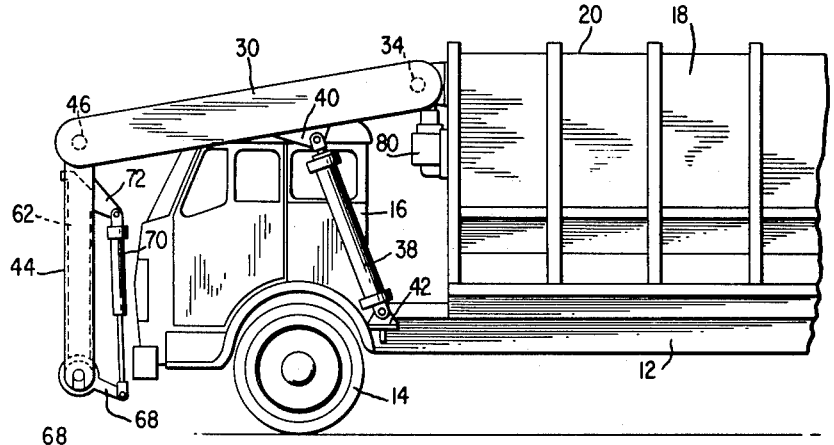
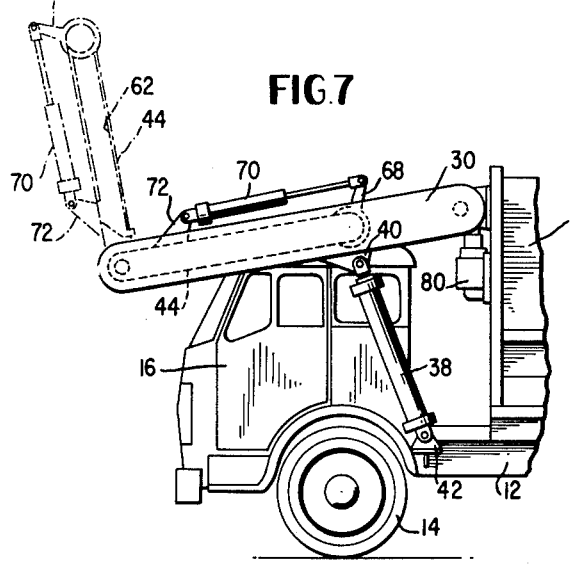
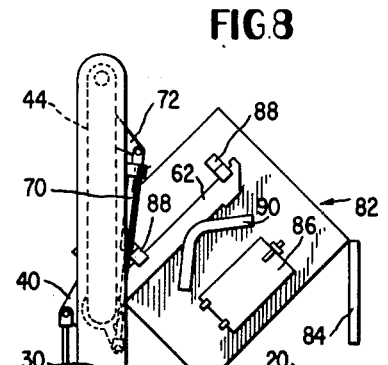
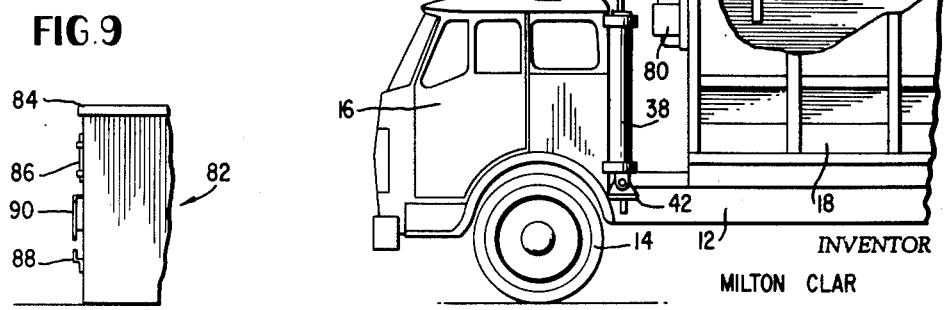

United States Patent Office 3,140,788
Patented July 14, 1964

3,140,788
SELF-LOADING VEHICLE
Milton Clar, Silver Spring, Md., assignor to Clar-Shayne, Washington, D.C., a partnership
Filed Mar. 14, 1961, Ser. No. 95,701
3 Claims. (Cl. 214—302)

This invention relates to self-loading vehicles, and more particularly to an improved mechanism for lifting and dumping a container or receptacle.

In the refuse collection and other material handling industries trucks are employed which incorporate a mechanism for lifting a container and emptying the same into the truck body. The container may be permanently attached to the lifting mechanism, or may be separable therefrom so that the container may remain at a convenientt site for filling. The lifting mechanism may be mounted at the front, side, or rear of the truck, the truck being designated accordingly as a front loader, side loader, or rear loader. The present invention has primary application to, but is not limited to, a front loader.

Front loaders currently in use employ a pair of elongated lifting members which are pivoted at one end on the truck chassis and which support or engage a container at the other end. The lifting members may be rigid or articulated arm assemblies and are located adjacent the opposite sides of the cab of the vehicle. The lifting force is usually obtained from hydraulic rams which engage the respective lifting members. Mechanisms of this type are required to lift a container and to move it rearwardly over the cab of the truck until the container reaches its destination above an opening at the top of the truck body. Then the mechanism must invert the container, so that the contents are dumped into the truck body.

Various types of arm assemblies have been proposed heretofore in an attempt to perform the desired functions while meeting additional requirements of (1) maintaining free access to the truck cab regardless of the position of the arm assemblies, (2) attaining good lifting efficiency, (3) preventing arm assembly deformation under heavy loads, (4) minimizing clearance problems with respect to adjacent structures, and (5) providing long operating life with minimum maintenance. With most of the arm assemblies employed heretofore, the orientation of the container changes as the arm assemblies are raised. The container tends to tip as it is lifted, resulting in premature spillage of the container contents, particularly when the container is filled to capacity. It is a principal object of the present invention to provide a lifting mechanism which alleviates the last-mentioned problem while catering to the previously-mentioned criteria of a desirable lifting mechanism.

Another object of the invention is to provide a unique self-loading vehicle.

A further object of the invention is to provide improved lifting arm assemblies.

An additional object of the invention is to provide lifting arm assemblies which may be readily placed in an unobtrusive rest position.

Another object of the invention is to provide improved containers for use with self-loading vehicles.

Briefly stated, and without limitation, the present invention is concerned with a self-loading vehicle having a container lifting and dumping mechanism with arm assemblies which lift a container while automatically maintaining its orientation substantially constant until the container is in position over the truck body, at which time the orientation of the container is changed to dump the contents into the truck body. The lifting arm assemblies comprise a pair of booms which are pivotally mounted on the truck chassis for movement about a substantially horizontal axis and which have container support means pivotally conected thereto. As the booms are raised, the container support means is turned with respect to the booms to maintain the orientation of the container. This is accomplished by an ararngement including an endless chain which passes over a pair of sprocket wheels, one of which may be held fixed, and the other of which turns with the container support means. The first-mentioned sprocket wheel may also be turned under certain circumstances. The container itself has unique means for engaging the lifting mechanism.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein:

FIGURE 6 is a fragmentary side elevation view illustrating a position of the lifting mechanism in which container engaging means are retracted;

FIGURE 7 is a fragmentary side elevation view illustrating the manner in which the arm assemblies assume a rest position;

FIGURE 8 is a fragmentary side elevation view illustrating the position of the arm assemblies at the time that the container is dumped; and FIGURE 9 is a fragmentary side elevation view of the container.

Figure 1:
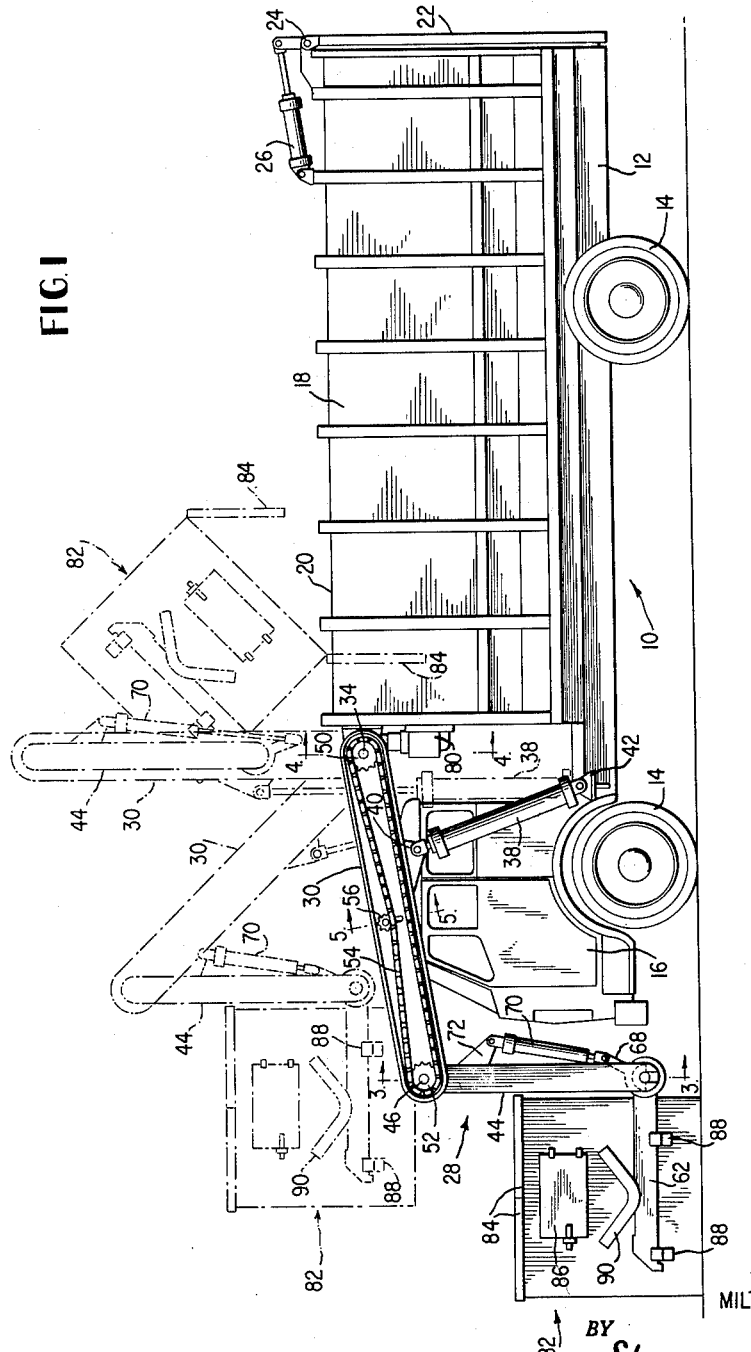
FIGURE 1 is a side elevation view illustrating a self-loading vehicle of the invention, a container of the invention employed therewith, and the manner in which the container is lifted and dumped.

Referring to the drawings, and initially to FIGURE 1 thereof, a preferred vehicle 10 of the invention comprises the usual self-propelled truck chassis 12 having wheels 14, an operator's cab 16 at the forward end of the chassis, and a body 18 mounted rearwardly of the cab. The body may comprise the usual frame and shell construction having a top opening at 20 for reception of refuse and the like. The rear end of the body may have a closure 22, which may be pivoted at 24 for movement about a horizontal axis by a hydraulic ram 26. The arm may be actuated when it is desired to open the closure 22 for expulsion of the contents of the body. The body may contain the usual compaction blade operated by the usual telescopic hydraulic cylinder. For actuation of the ram 26 and others to be described, a conventional hydraulic system is provided, including the usual pump and control valves.

Figure 2:
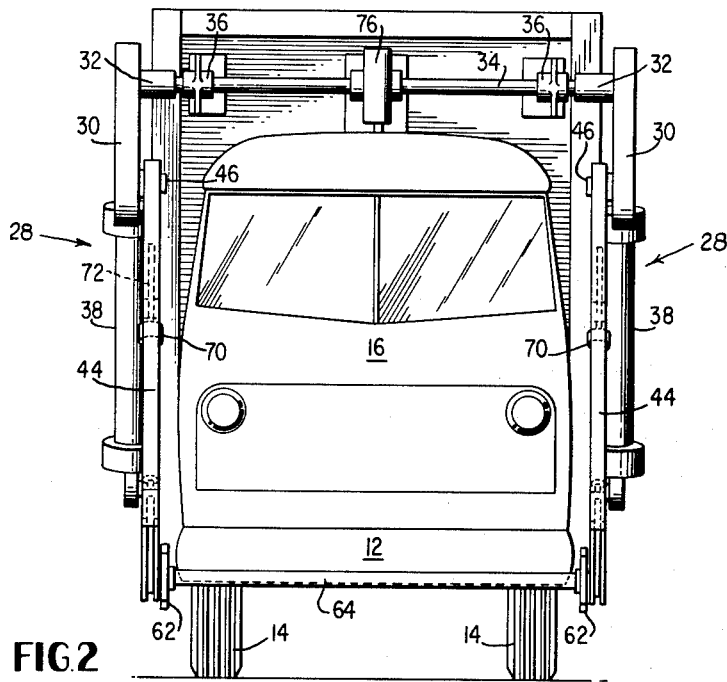
FIGURE 2 is a front view of the vehicle of FIGURE 1.
Figure 3:
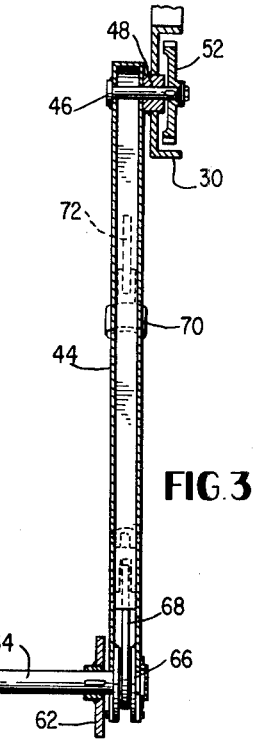
FIGURE 3 is a sectional view taken along line 3—3 of FIGURE 1.
Figure 4:
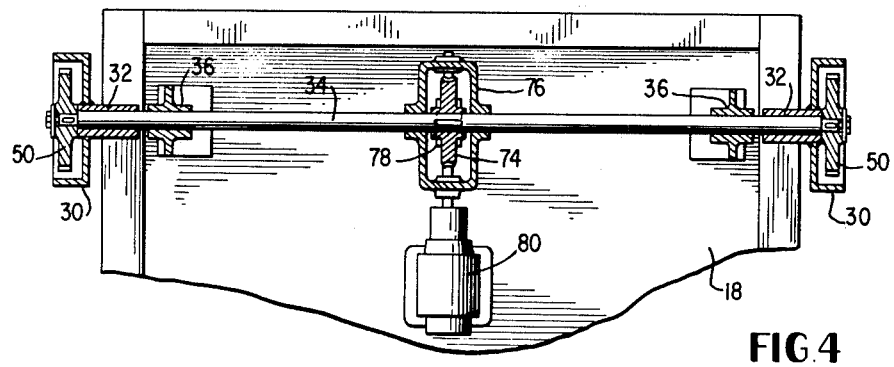
FIGURE 4 is a sectional view taken along line 4—4 of FIGURE 1.

The loading mechanism comprises a pair of spaced, substantially parallel arm assemblies 28, one at each side of the truck as shown in FIGURE 2. Each arm assembly comprises a boom 30 having one end pivotally mounted on the chassis or body frame so as to permit movement of the boom about a substantially horizontal axis. As shown in FIGURE 4, the booms may comprise channels having journal sleeves 32 fixed thereto, the sleeves being rotatable about a shaft 34, which in turn is supported in bearing sleeves 36 mounted on the truck chassis or body frame. In the form shown the booms are pivoted behind and slightly above the operator's cab and slope downwardly. The booms are raised and lowered by hydraulic rams 38, which are pivotally connected to brackets 40 fixed to the underside of the booms and to brackets 42 fixed to the truck chassis. Pivotally suspended from the other end of the booms are lifting arms 44, which may be of box-like construction. The length of the arms is somewhat less than that of the booms. As shown in FIGURE 3, the lifting arms may be suspended from shafts 46 fixed thereto and rotatable in bearings 48 mounted on the booms.

Figure 5:
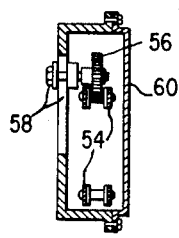
FIGURE 5 is a sectional view taken along line 5—5 of FIGURE 1.

As shown in FIGURE 4, the shaft 34 has sprocket wheels 50 fixed thereto at its opposite ends. The sprocket wheels may be housed within the booms. As shown in FIGURE 3, shafts 46 have sprocket wheels 52 fixed thereto, which may also be housed within the booms. As illustrated in FIGURE 1, an endless elongated flexible member, preferably in the form of a chain 54, passes around the associated sprocket wheels 50 and 52 of the booms. A tensioning idler sprocket wheel 56 may be adjustably mounted on each boom, as indicated by the slot and nut construction 58 in FIGURE 5, to maintain the chains under the desired tension. Cover plates 60 may close the open boom channels as shown in FIGURE 5, the cover plates being omitted from certain figures for explanatory purposes.

Arms 44 support the container engaging means, which may take the form of beams or tines 62 pivotally mounted at the lower end of the arms. The beams project horizontally in front of the operator's cab and may be fixed to a transverse shaft 64 which spans the distance between the arms 44. The ends of the shaft are supported in split bearing caps 66 which are secured to arms 44 and permit the shaft to turn with respect to the arms. The shaft ends have cranks 68 fixed thereto which are pivotally connected to hydraulic rams 70 pivotally suspended from brackets 72 on the arms 44.

It is apparent that the sprocket wheels 52 may be turned to turn the arms 44 with respect to the booms 30 and that the shaft 64 may be turned to turn the beams 62 with respect to the arms 44. In accordance with the invention the sprocket wheels 50 may be held fixed or turned selectively. As shown in FIGURE 4, shaft 34 has a worm wheel 74 fixed thereto in a gear housing 76, which also contains a worm 78 meshed with the worm wheel and driven by the shaft of a motor 80, which may be a rotary hydraulic type. The motor and gear housing may be mounted on the body as shown. When the motor is not energized, the shaft 34 is held immobile, because the worm wheel 74 is unable to turn with respect to the worm 78. When the motor is energized, however, the worm turns the worm wheel, which turns the shaft 34 and the sprocket wheels 50.

The containers 82 of the invention may be of generally rectangular box configuration and may have a cover or lid 84, which is a hinged two-part lid in the form shown. The container may be mounted on casters, if desired. As shown, the container may have a side access door 86 into which refuse or other material may be inserted. The container may also be loaded through the top, if desired. At the ends (or sides) the container is provided with means for engaging the lifting beams 62 on the self-loading vehicle. In accordance with the invention, these means comprise separate elements for engaging the upper and lower sides of the lifting beams. In the form illustrated in FIGURE 1, there are two lower elements 88 and an upper element 90 mounted on each end wall. The lower elements are angle brackets having upwardly projecting flanges spaced from the corresponding end wall of the container. See FIG. 9. The upper element may comprise a generally V-shaped angle member with the flange extending downwardly and spaced from the associated end wall of the container. The lower elements are spaced horizontally from each other and are spaced horizontally and vertically from the upper element. The end walls of the container are spaced slightly less than the beams 62 to permit the beams to embrace the container as will be described.

To engage the container 82 with the lifting mechanism, the truck is advanced toward the container (or vice versa) with the beams 62 extending forwardly as shown in FIGURE 1. If the container is orientated with its end walls substantially parallel to the beams 62 and is properly located with respect to the axis of the truck, the respective beams 62 will successively enter between the flanges of the elements 88 and 90 and the associated end walls of the container, until the relationship of the elements and the beams is as shown in FIGURE 1 (the hidden side being identical).

If now it is desired to lift the container without changing its orientation, the hydraulic rams 38 are actuated from the central hydraulic supply system of the vehicle, raising booms. The raising of the booms causes the chains 54 to wind about the fixed sprocket wheels 50, turning the sprocket wheels 52 and turning the lifting arms 44 with respect to the booms, so as to maintain the orientation of the container, as shown by the intermediate position in FIG. 1. This orientation of the container is maintained until the booms have reached the limit of their upward movement, which may be a substantially vertical position with the arms 44 parallel to the booms. Then, in order to dump the container, the hydraulic rams 70 are actuated, causing the shaft 64 and the attached beams 62 to turn so as to invert the container, as shown in FIGURES 1 and 8. The cover 84 opens by gravity, permitting the contents of the container to fall into the truck body. By maintaining somewhat more clearance between the lower elements 88 and the upper element 90 that is required for passage of beams 62, the container will be jolted as it is inverted, assisting in the expulsion of the material from the container. When the container is empty, the rams 70 are actuated in the reverse direction, so as to right the container. Then the rams 38 are operated in reverse so as to lower the booms 30.

To reduce the forward projection of the lifting mechanism for over-the-road travel, the projecting beams 62 may be retracted by actuating the hydraulic rams 70 so as to move the beams to the position illustrated in FIGURE 6. Moreover, the arms 44, along with the beams 62 may be moved to a rest position atop the truck as shown in FIG. 7. This is accomplished by actuating the motor 80 so as to turn the shaft 34 and the sprocket wheels 50. This causes the chains 54 to move, without movement of the booms, turning the sprocket wheels 52 along with the attached arms 44, as indicated in FIGURE 7. A rest or stop 92 (FIG. 8) may be placed atop the operator's cab to receive the shaft 64 or another appropriate portion of the arm assemblies.

It is thus apparent that the present invention provides a self-loading mechanism for a vehicle which permits container orientation to be maintained constant as the container is lifted. The lifting efficiency of the mechanism is good; the lifting arm assemblies do not interfere with access to the cab; minimal clearance is required for operation of the lifting mechanism; the lifting arm assemblies may be readily constructed to resist deformation under heavy loads; and the lifting mechanism has long life with little maintenance. The fact that the container-engaging beams remain substantially horizontal during the lifting operation permits the lifting of containers from loading docks and the like which are above ground level. Moreover, the fact that the container-engaging beams do not move appreciably forward during lifting, permits the lifting of containers which are adjacent the wall of a building.

While preferred embodiments of the invention have been shown and described, it will be apparent to those skilled in the art that changes can be made in these embodiments without departing from the principles and spirit of the invention, the scope of which is defined in the appended claims. For example, the shape and dimensions of the components of the arm assemblies may be varied. Accordingly, the foregoing embodiments are to be considered illustrative, rather than restrictive of

The invention claimed is:

1. A front-loading vehicle of the type described, comprising a vehicle chassis having an operator's cab mounted at the front of the chassis and having a refuse-type body mounted on the chassis behind the cab, said body having an access opening at the top, a loading mechanism including a pair of booms, a pair of lifting arms, and a pair of load-engaging beams, each boom being pivotally mounted at one end on said vehicle adjacent the top-rear of said cab for movement in a substantially vertical plane and having one of said lifting arms pivotally suspended at one end thereof from the other boom end, each of said lifting arms having one of said beams pivotally mounted adjacent the other arm end, each of said booms having a pair of sprocket wheels mounted thereon adjacent its respective ends for rotation in a substantially vertical plane, each pair of wheels having an endless chain passing therearound, a pair of hydraulic rams connected to said booms, respectively for turning them about their pivots, a pair of hydraulic rams connected to said beams, respectively, for turning them about their pivots, a shaft connecting the sprocket wheels adjacent the pivots of said booms, a worm wheel on said shaft, a worm gear meshing with said worm wheel, and a motor for driving said worm gear.

2. A front loading vehicle of the type described, comprising a vehicle chassis having an operator's cab mounted at the front of the chassis and having a body mounted on the chassis behind the cab, said body having an access opening at the top, a loading mechanism including a pair of booms, a pair of lifting arms, and load engaging means, each boom being pivotally mounted at one end on said vehicle adjacent the top-rear of said cab for movement in a substantially vertical plane and having one of said lifting arms pivotally suspended at one end thereof from the other boom end, said load engaging means being supported upon said lifting arms, means for moving said booms from a lowered position in which said booms extend forwardly and said lifting arms extend downwardly adjacent the front of said cab, and a raised position in which said booms extend upwardly and said lifting arms extend downwardly adjacent said body access opening, and means positively turning said lifting arms relative to said booms as said booms are moved, to ensure predetermined orientation of said arms, said orientation ensuring means comprising a pair of sprocket wheels mounted at the respective ends of at least one of said booms and a chain interconnecting said sprocket wheels, one of said wheels being normally fixed and the other of said wheels being turnable with said lifting arms.

3. The vehicle of claim 2, further comprising means for folding said lifting arms toward said booms with the booms in their lowered position, said arm folding means comprising means for turning said normally fixed wheel.

References Cited in the file of this patent
UNITED STATES PATENTS

| | | |
|---|---|---|
| 2,469,321 | Wood | May 3, 1949 |
| 2,702,721 | Dempster | Feb. 22, 1955 |
| 2,815,138 | Noffsinger | Dec. 3, 1957 |
| 2,878,051 | Jones | Mar. 17, 1959 |
| 2,900,096 | Dempster et al. | Aug. 18, 1959 |
| 2,908,411 | Ambarcumian | Oct. 13, 1959 |
| 2,936,916 | Dempster et al. | May 17, 1960 |
| 2,984,374 | Herpich et al. | May 16, 1961 |